(12) United States Patent
Matsuoka (10) Patent No.: US 6,859,165 B2
(45) Date of Patent: Feb. 22, 2005

(54) PULSE RADAR DEVICE

(75) Inventor: Katsuji Matsuoka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/668,298

(22) Filed: Sep. 24, 2003

(65) Prior Publication Data

US 2004/0196175 A1 Oct. 7, 2004

(30) Foreign Application Priority Data

Sep. 30, 2002 (JP) ........................................ 2002-286413

(51) Int. Cl.⁷ .............................................. G01S 7/28
(52) U.S. Cl. ........................ 342/118; 342/130; 342/201; 342/202
(58) Field of Search ........................ 342/118, 127–135, 342/200–204

(56) References Cited

U.S. PATENT DOCUMENTS

| | | | | |
|---|---|---|---|---|
| 2,716,233 A | * | 8/1955 | Westwood | 342/134 |
| 4,132,991 A | * | 1/1979 | Wocher et al. | 342/134 |
| 4,306,458 A | * | 12/1981 | Weyns et al. | 73/621 |
| 4,307,399 A | * | 12/1981 | Love et al. | 342/150 |
| 6,590,522 B2 | | 7/2003 | Okamura | |
| 6,597,308 B2 | * | 7/2003 | Isaji | 342/70 |
| 6,606,054 B2 | | 8/2003 | Okamura | |
| 2003/0016163 A1 | * | 1/2003 | Isaji | 342/70 |

FOREIGN PATENT DOCUMENTS

| | | | |
|---|---|---|---|
| JP | 7-72237 A | 3/1995 | |
| JP | 2004125451 A | * 4/2004 | ............ G01S/13/10 |

* cited by examiner

Primary Examiner—John B. Sotomayor
(74) Attorney, Agent, or Firm—Sughrue Mion, PLLC

(57) ABSTRACT

A pulse radar device includes a rectangular signal generating section for generating a rectangular signal that is a reference signal; a transmit timing voltage setting section for setting a voltage value for determining a transmit timing; a transmit pulse generating section for generating a transmit pulse based on the rectangular signal and the voltage value; a receive section for receiving a reflection wave obtained by reflecting the electric wave transmitted by the transmit section by a plurality of objects; a receive saw-tooth wave generating section for generating a saw-tooth wave in synchronism with the transmit pulse; a receive signal sample hold section for sample-holding the receive signal based on the outputs from the saw-tooth wave and the rectangular signal; and a detecting and distance measuring section for detecting the objects and measuring a distance to the objects based on the sample/hold output.

3 Claims, 12 Drawing Sheets

FIG.13 the pulse radar device of the present invention comprises a receive saw-tooth wave generating means for generating a saw-tooth wave in synchronism with the transmit pulse outputted from the transmit pulse generating means; a receive signal sample hold means for sample-holding a level of the saw-tooth wave at the time where the receive signal is inputted from the receive means on the basis of the saw-tooth wave from the receive saw-tooth wave generating means and the rectangular signal from the rectangular signal generating means; and a detecting and distance measuring means for detecting the objects and measuring a distance to the objects on the basis of the sample/hold output from the receive signal sample hold means.

PULSE RADAR DEVICE

BACKGROUND OF THE INVENTION

1. Field of the Invention

The present invention relates to a pulse radar device, and more particularly to a pulse radar device that transmits an electric wave, and detects the presence/absence of an object by receiving a reflection wave obtained by the reflection of the transmitted electric wave from the object, to thereby measure a distance to the detected object.

2. Description of the Related Art

In the conventional pulse radar device, a pulsed signal is periodically outputted by a transmit means. Then, a reflection pulse from an object is continuously received by a receive means, and then binary-coded by a binary coding means. A sampling means samples a binary signal at every one or plural given sampling points after the transmit timing of the transmit means; obtains a sampling value of 0 or 1; and supplies the sampling value to an adding means corresponding to the respective sampling points. The adding means adds the sampling value of 0 or 1 at every given transmit number of times of the signals by the transmit means. Upon the completion of the adding process by the given number of times, a judging means compares a normalized addition value obtained by dividing the addition values in each of the adding means by the number of times of addition with a given threshold value, judges whether or not the reflection signal from the external object exists on the basis of the comparison result, and judges the presence/absence of the external object on the basis of the judgment result (for example, refer to JP 07-722237A, page 1 and FIG. 1).

In the above-mentioned conventional device, in the case where a precision in the distance to the object is required, it is necessary to fine a sampling interval of the sampling means. In order to achieve this, a high-frequency clock is required, resulting in such a problem that the device becomes expensive. Also, there is proposed a method in which a receive wave is subjected to A/D conversion, and the distance precision is improved by the received waveform. However, a high-speed A/D converter is required, resulting as well in such a problem that the device becomes expensive.

SUMMARY OF THE INVENTION

The present invention has been made to solve the above-mentioned problem, and therefore an object of the present invention is to provide a pulse radar device that is inexpensive and high in precision.

With the above object(s) in view, the pulse radar device of the present invention comprises a rectangular signal generating means for generating a rectangular signal that is a reference signal. The pulse radar device of the present invention also comprises a transmit timing voltage setting means for setting a voltage value for determining a transmit timing; a transmit pulse generating means for generating a transmit pulse on the basis of the rectangular signal from the rectangular signal generating means and the voltage value from the transmit timing voltage setting means; a transmit means for transmitting an electric wave of the generated transmit pulse. The pulse radar device of the present invention also comprises a receive means for receiving a reflection wave obtained by reflecting the electric wave by a plurality of objects so as to output its receive signal. Further,

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
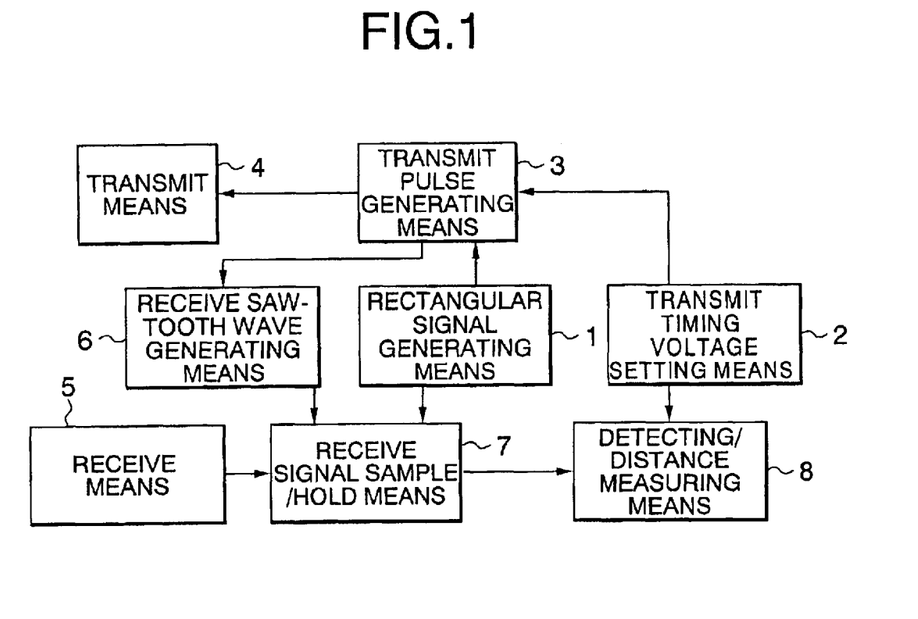
FIG. 1 is a block diagram showing a structure of a pulse radar device in accordance with the present invention.

Hereinafter, a structure of a pulse radar device according to the present invention will be described with reference to the drawings. FIG. 1 is a block diagram showing the structure of a pulse radar device in accordance with the present invention. As shown in FIG. 1, the pulse radar device according to the present invention is provided with a rectangular signal generating means 1 that generates a rectangular signal as a reference signal and a transmit timing voltage setting means 2 that sets a voltage value for determining a transmit timing, which are connected to a transmit pulse generating means 3 that generates a transmit pulse on the basis of outputs from the rectangular signal generating means 1 and the transmit timing voltage setting means 2. Also, the transmit pulse that is a pulsed electric wave generated by the transmit pulse generating means 3 is transmitted toward an object to be measured by the transmit means 4. A receive means 5 receives a reflection wave obtained by the reflection of the electric wave transmitted by the transmit means 4 from a plurality of objects to output a receive signal. The pulse radar device according to the present invention is also provided with a receive saw-tooth wave generating means 6 that generates a saw-tooth wave on the basis of an output from the transmit pulse generating means 3 and a receive signal sample/hold means 7 that samples and holds the receive signal on the basis of the outputs from the receive saw-tooth wave generating means 6 and the rectangular signal generating means 1. Further, the pulse radar device according to the present invention is provided with a detecting/distance measuring means 8 that detects the object and measures a distance to the object on the basis of the outputs from the receive signal sample/hold means 7 and the transmit timing voltage setting means 2.

Figure 2:
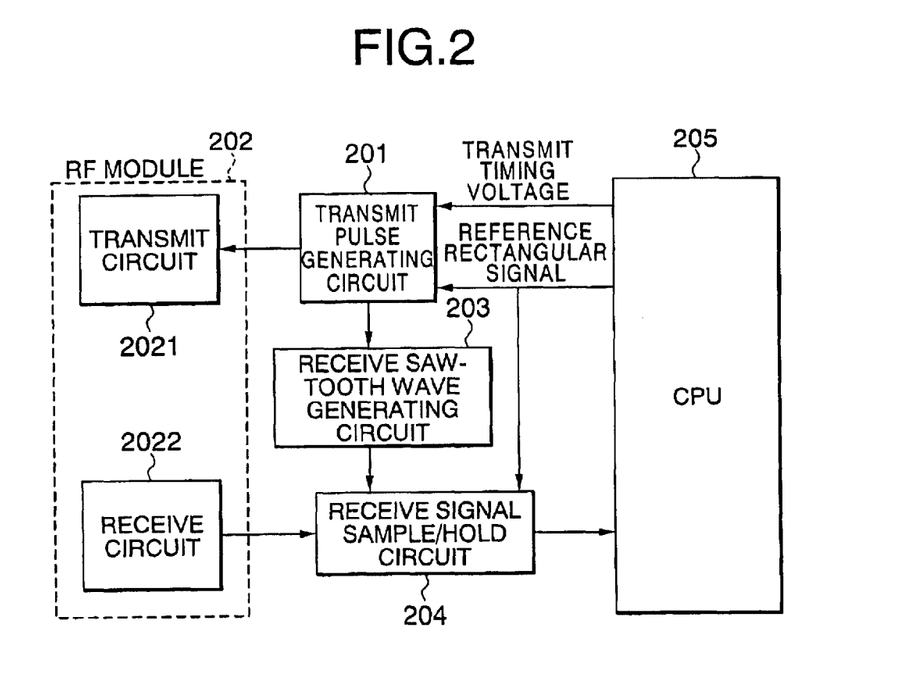
FIG. 2 is a block diagram showing one example of a specific structure of a pulse radar device in accordance with a first embodiment of the present invention.

Subsequently, an actual specific structural example of the pulse radar device in accordance with the present invention as shown in FIG. 1 will be described below. As shown in FIG. 2, the pulse radar device according to this structural example is roughly composed of five parts. That is, the pulse radar device according to the present invention is constructed by a transmit pulse generating circuit 201 that generates the transmit pulse according to the reference rectangular signal and the transmit timing voltage, an RF module 202 that is composed of a transmit circuit 2021 that transmits a pulsed electric wave and a receive circuit 2022 that receives the reflection wave, a receive saw-tooth wave generating circuit 203 that generates the saw-tooth wave on the basis of the output from the transmit pulse generating circuit 201, a receive signal sample/hold circuit 204 that samples and holds the receive signal on the basis of the outputs from the receive saw-tooth wave generating circuit 203 and the rectangular signal, and a CPU 205 that generates the above-mentioned reference rectangular signal and transmit timing voltage, detects the object, and measures the distance to the object on the basis of the output from the receive signal sample/hold circuit 204 and the transmit timing voltage.

A correspondence relationship of FIG. 1 to FIG. 2 will be described. The transmit circuit 2021 shown in FIG. 2 corresponds to the transmit means 4 shown in FIG. 1, and likewise the receive circuit 2022 in FIG. 2 is the receive means 5 in FIG. 1, the transmit pulse generating circuit 201 in FIG. 2 is the transmit pulse generating means 3 in FIG. 1, the receive saw-tooth wave generating circuit 203 in FIG. 2 is the receive saw-tooth wave generating means 6 in FIG. 1, and the receive signal sample/hold circuit 204 in FIG. 2 is the receive signal sample/hold means 7 in FIG. 1. Also, the CPU 205 in FIG. 2 includes the rectangular signal generating means 1, the transmit timing voltage setting means 2 and the detecting/distance measuring means 8 in FIG. 1.

Figure 3:
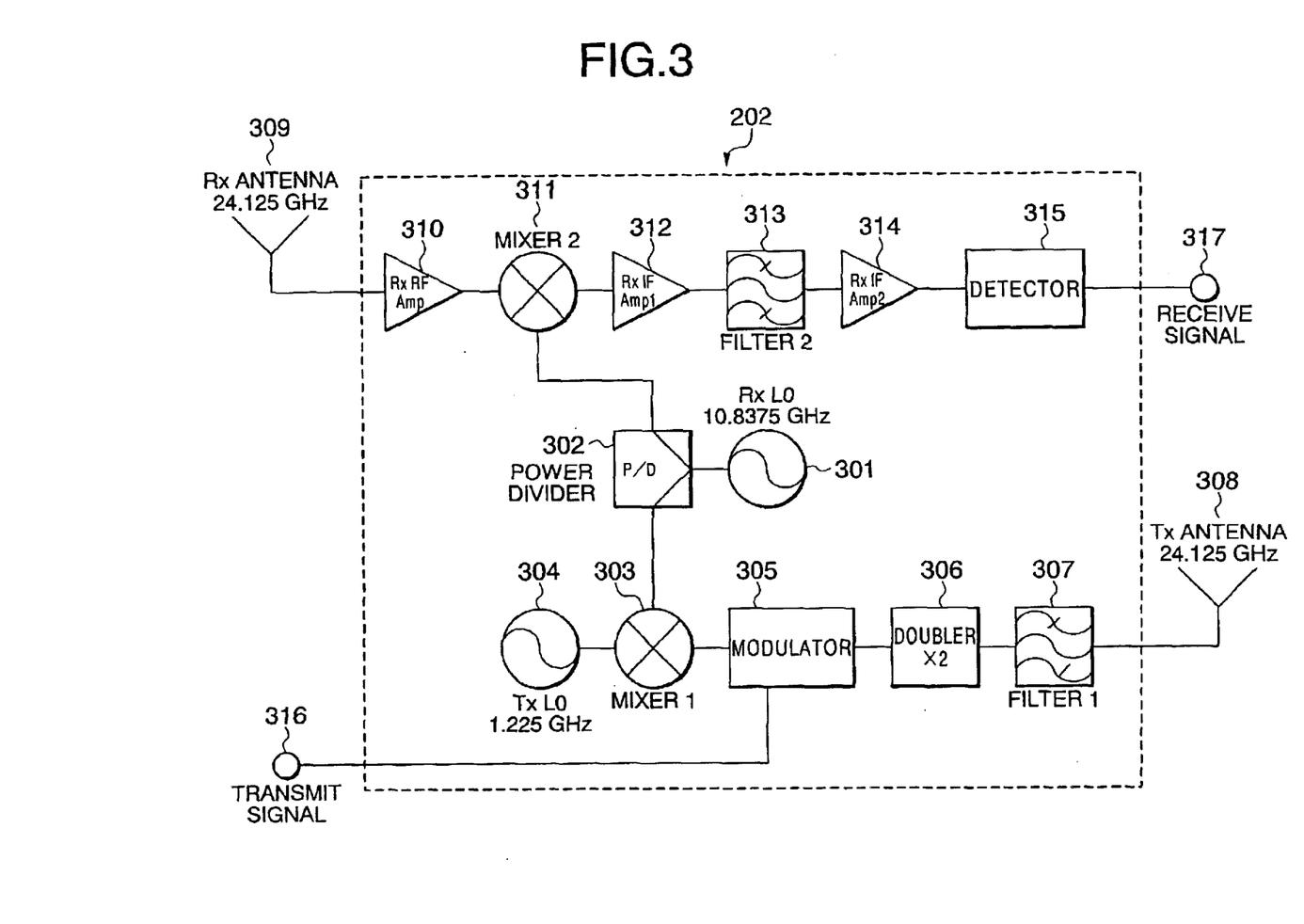
FIG. 3 is a structural diagram showing a structure of an RF module in accordance with the first embodiment of the present invention.

A specific structural example of the RF module 202 of FIG. 2 is shown in FIG. 3. A signal of 10.8375 GHz generated by an RxLO oscillator 301 is divided into two signals by a power divider 302. One of those divided signals is mixed with a signal of 1.225 GHz generated by a TxLO oscillator 304 in a mixer 1 (303), and thereafter becomes a pulsed signal on the basis of a transmit signal 316 inputted to a modulator 305 in the modulator 305. Then, the signal is doubled by a doubler 406 and then becomes a signal of 24.125 GHz by a filter 1 (307) and radiated to the outside as an electric wave by a Tx antenna (308). The filter 1 is so structured as to allow only a frequency component within a given band to pass therethrough. The electric wave thus radiated and reflected from an external object is received by an Rx antenna (309) and amplified by an RxRF amplifier 310, and thereafter mixed with a signal from the RxLO oscillator 301 which is another signal of two signals that have been divided by the power divider 302 by a mixer 2 (311) so as to drop down to an intermediate frequency. Thereafter, the signal passes through an RXIF amplifier 1 (312), a filter 2 (313) and an RXIF amplifier 2 (314), and is envelope-detected by a detector 315 so as to become a receive signa 1317. The filter 2 is so structured as to pass through only the frequency component within a given band.

Figure 4:
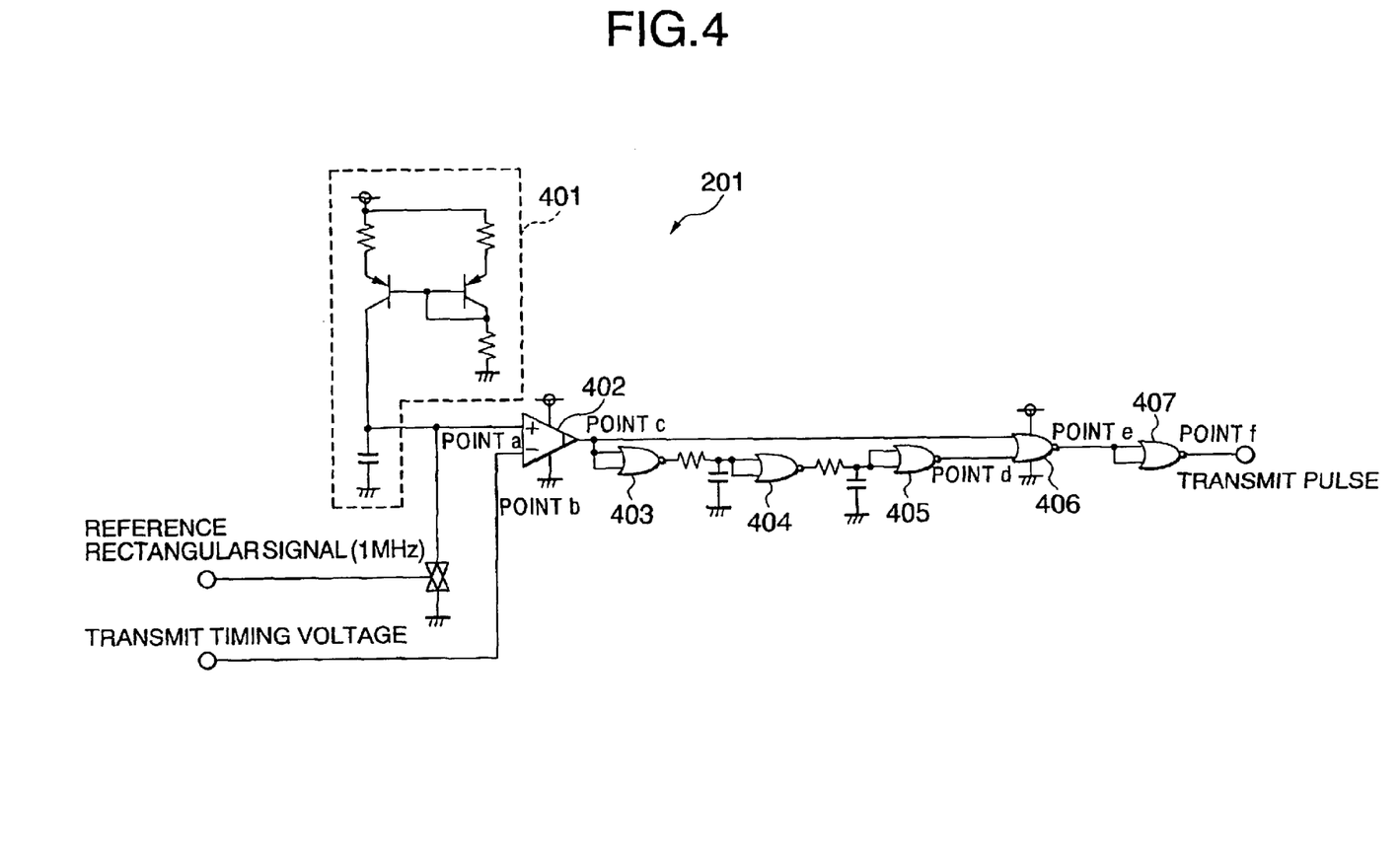
FIG. 4 is a circuit diagram showing a structure of a transmit pulse generating circuit in accordance with the first embodiment of the present invention.
Figure 5:
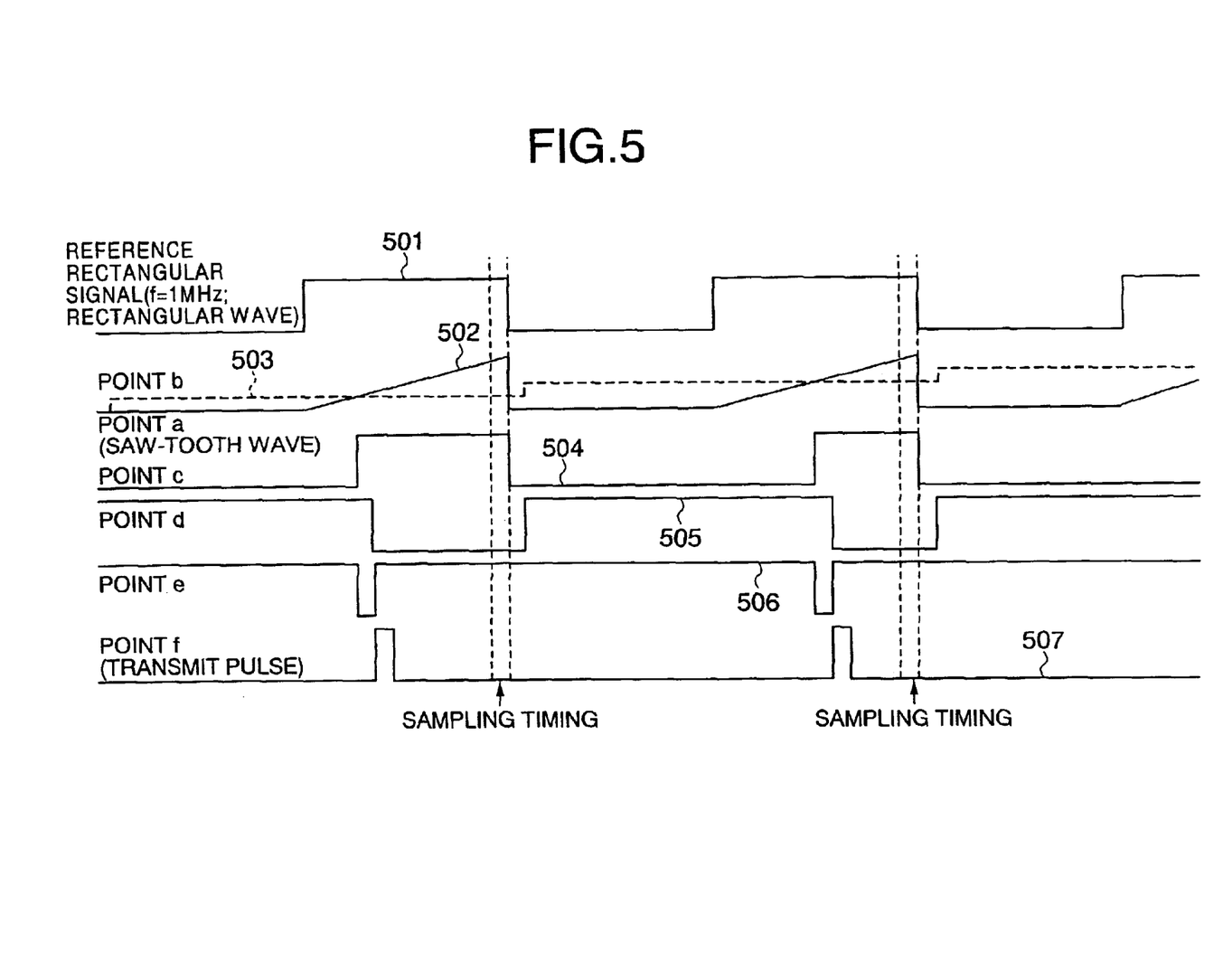
FIG. 5 is a timing chart showing an operation of the transmit pulse generating circuit in accordance with the first embodiment of the present invention.

Subsequently, the transmit pulse generating circuit 201 shown in FIG. 2 will be described. FIG. 4 is a circuit diagram showing the transmit pulse generating circuit, and FIG. 5 is a timing chart. As shown in FIGS. 4 and 5, there is disposed a circuit 401 that generates a saw-tooth wave 502 in synchronism with a reference rectangular signal 501, and its output 502 and a transmit timing voltage 503 are compared with each other by a comparator 402, to thereby generate a transmit pulse rectangular signal 504. Then, the transmit pulse rectangular signal 504 is delayed and inversed by NOR gates 403 to 405 to generate a new rectangular signal 505, which is inputted to a NOR gate 406 together with the output 504 of the comparator 402. Then, an output 506 of the NOR gate 406 is further allowed to pass through a NOR gate 407 to obtain a transmit pulse 507.

Figure 6:
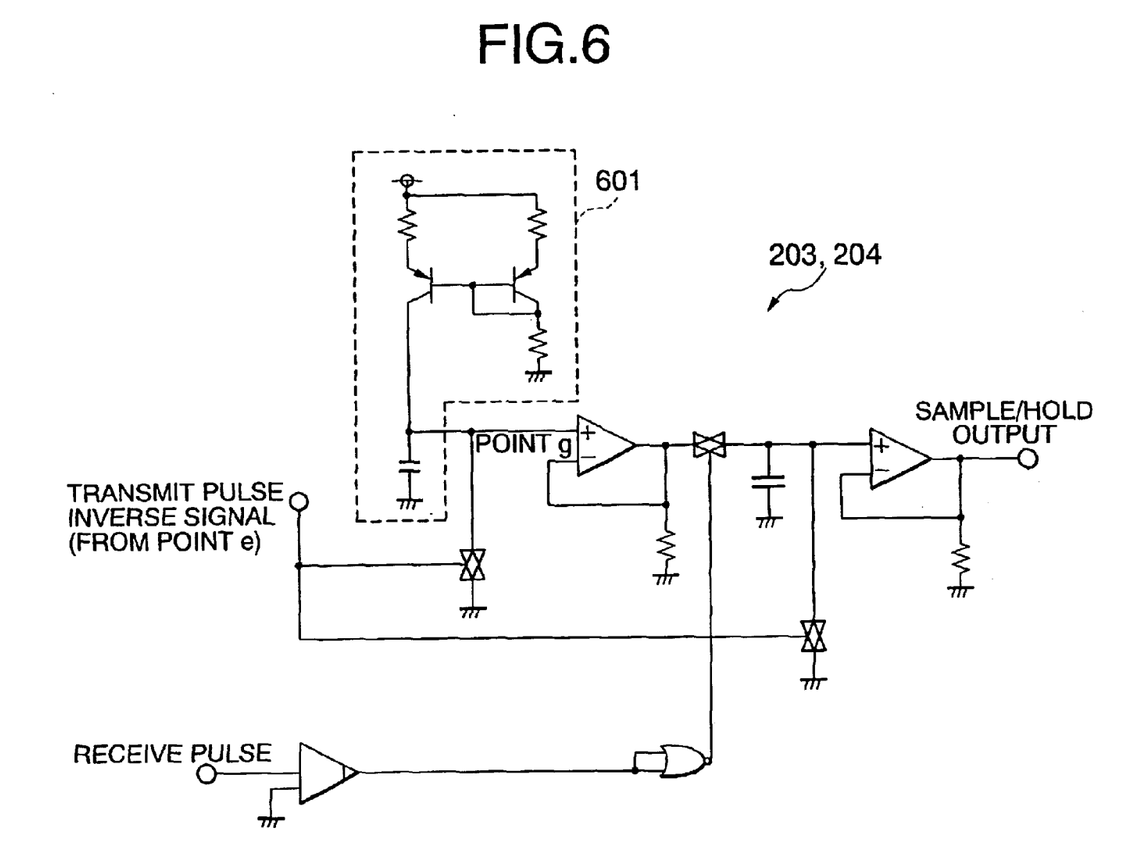
FIG. 6 is a circuit diagram showing a structure of a receive saw-tooth wave generating circuit in accordance with the first embodiment of the present invention.
Figure 7:
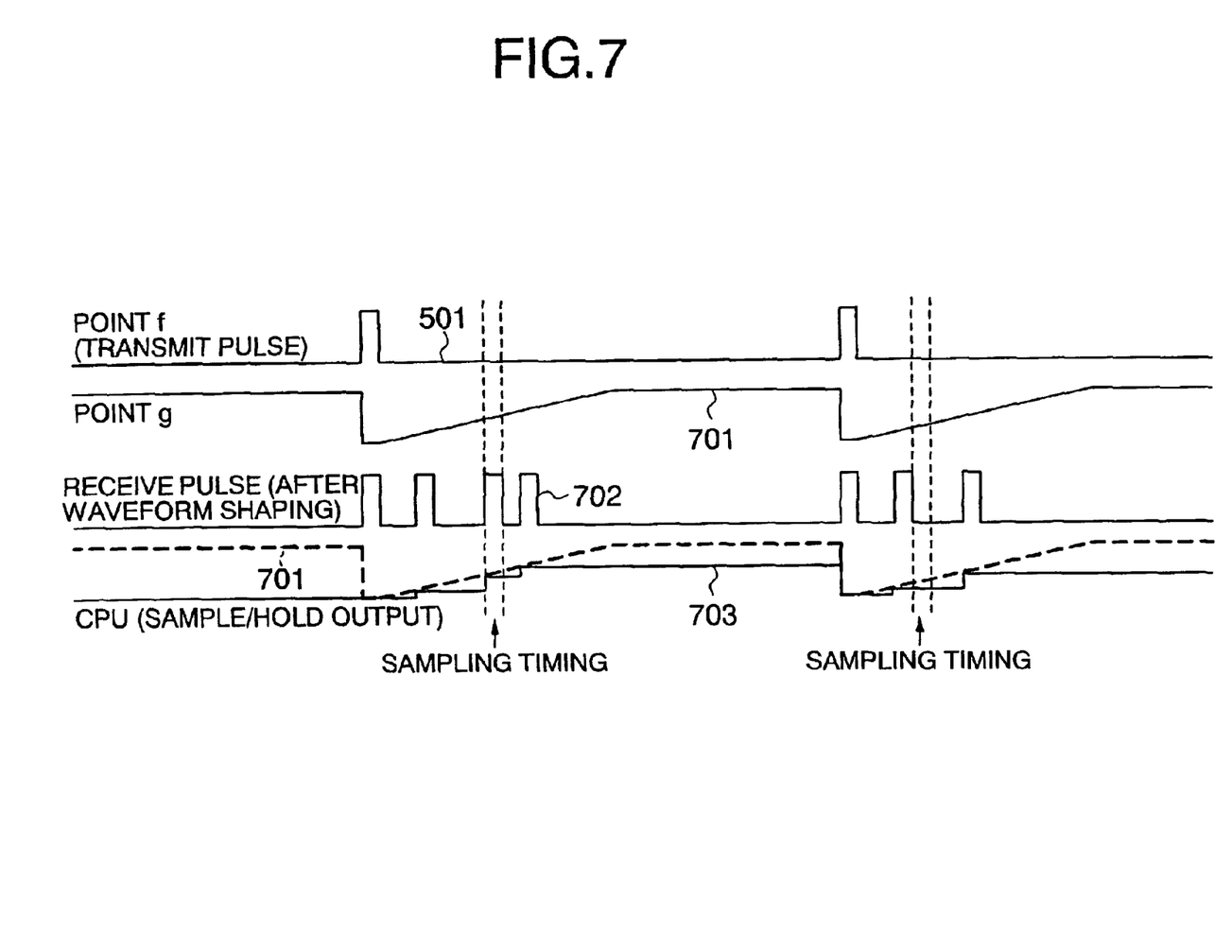
FIG. 7 is a timing chart showing an operation of the receive saw-tooth wave generating circuit in accordance with the first embodiment of the present invention.

Subsequently, the receive saw-tooth wave generating circuit 203 and the receive signal sample/hold circuit 204 shown in FIG. 2 will be described below. FIG. 6 is a circuit diagram of the receive saw-tooth wave generating circuit 203 and the receive signal sample/hold circuit 204, and FIG. 7 is a timing chart. As shown in FIGS. 6 and 7, there is disposed a circuit 601 (receive saw-tooth wave generating circuit 203) that generates a saw-tooth wave 701 in synchronism with the transmit pulse signal 501 (refer to FIG. 5), and a downstream circuit (receive signal sample/hold circuit 204) samples and holds the level of the saw-tooth wave 701 when the receive signal 702 is inputted, to thereby obtain a sample/hold output 703.

Figure 8:
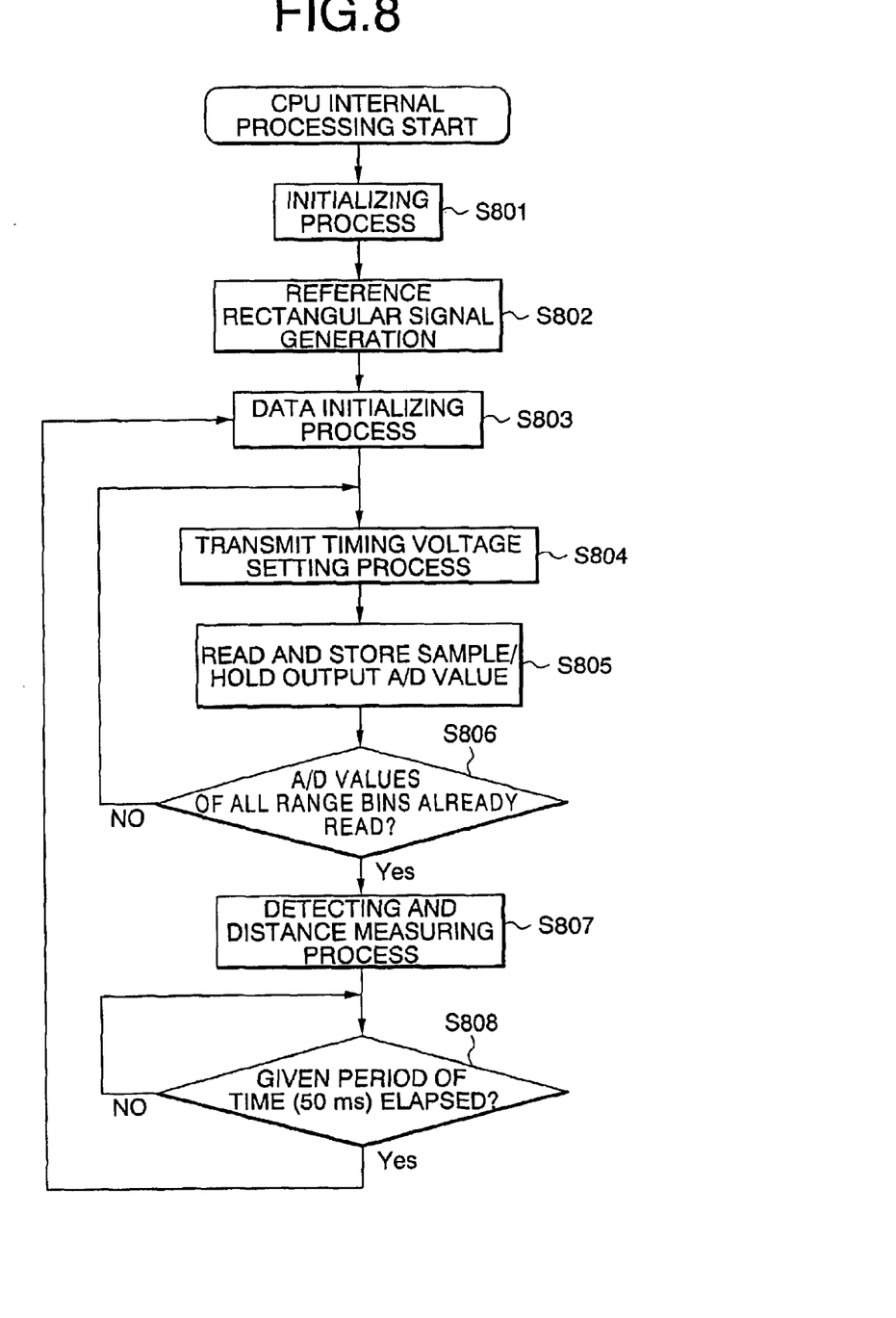
FIG. 8 is a flowchart showing a flow of processing within a CPU in accordance with the first embodiment of the present invention.
Figure 9:
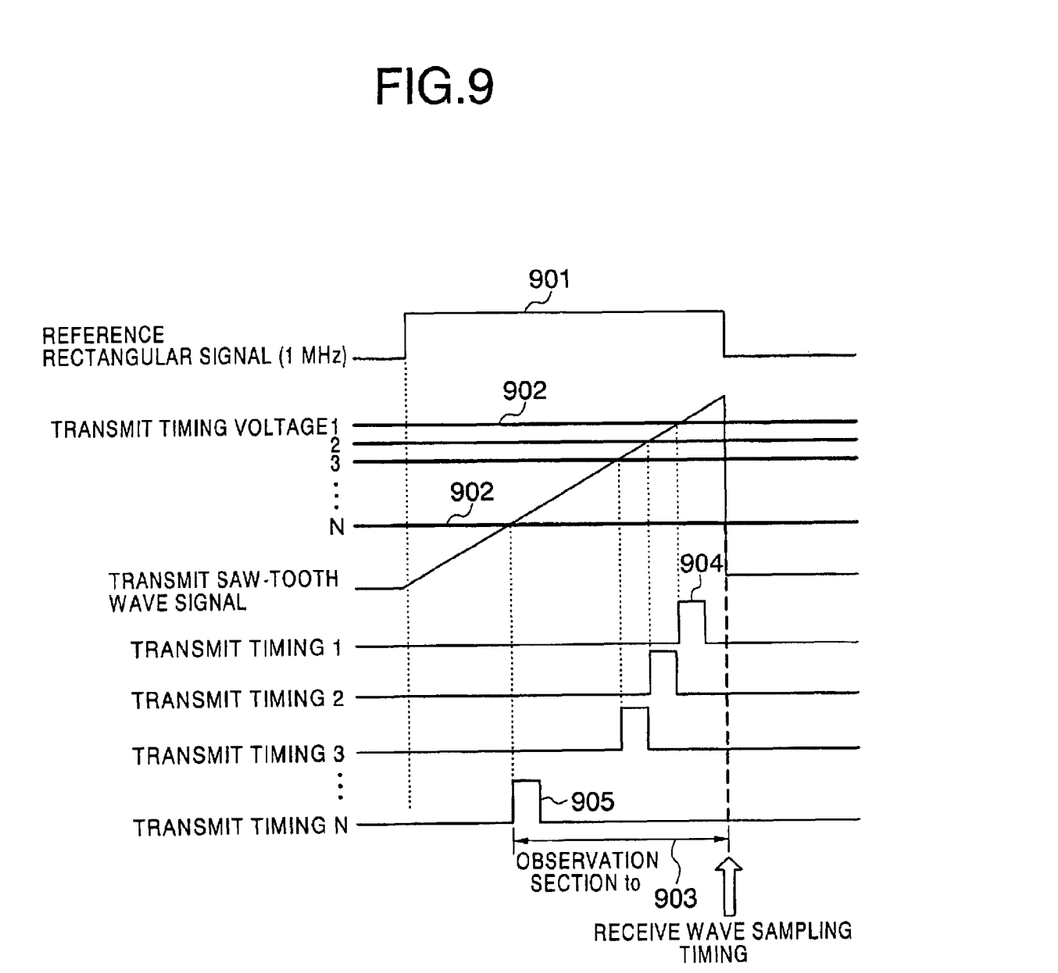
FIG. 9 is a timing chart for explaining a transmit timing voltage setting process in accordance with the first embodiment of the present invention.

Then, the internal processing of the CPU 205 will be described. FIG. 8 is a flowchart, and FIG. 9 is a timing chart, respectively. First, the interior of the CPU 205 is initialized in Step S801. Then, a reference rectangular signal 901 is generated in Step S802, and data is initialized in Step S803 (processing up to this step corresponds to the rectangular signal generating means 1).

In Step S804, a voltage value that determines the timing of the transmit pulse is set to a given value by D/A output. In this example, setting is made by D/A, but it is possible that a PWM signal is outputted, and the timing voltage of the transmit pulse is set in combination with a PWM control circuit. In this example, a plurality of transmit timing voltages 902 are prepared. That is, as shown in FIG. 9, N transmit timing voltages 902 are prepared in an observation section to 903 to set N range bins. Therefore, at this time, the sampling time becomes to/N. The transmit timing voltage 902 is set up to a transmit timing N (905) from a transmit timing 1 (904) of FIG. 9 in order (processing up to this step corresponds to the transmit timing voltage setting means 2.). As the setting method, as shown in FIG. 9, times when the transmit saw-tooth wave signal reaches the levels of the transmit timing voltage values 1 to N which are determined to given values are set as the transmit timings 1 to N, respectively. Accordingly, in the example shown in FIG. 9, the transmit timings become the order of N, . . . , 3, 2, 1 in time series. In the example of FIG. 9, the values of the respective transmit timing voltages 1 to N reduce with the voltage value width of a regular interval in order (that is, a difference between the transmit timing voltages 1 and 2 is identical with a difference between the transmit timing voltages i and i+1.), but the present invention is not limited to this case, and the intervals may be slightly changed.

In Step S805, the A/D value of the sample/hold output is read, and data is stored in a register (Data[i], i: range bin). In Step S806, it is judged whether or nor the A/D values of all the range bins are read and if not, processing is returned to Step S804, and if all the range bins have been read, processing is advanced to the detecting/distance measuring process of Step S807. In a succeeding step S808, it is judged whether or not a given period of time (for example, 50 ms) has been elapsed and if so, the processing is returned to Step S803, but if not, waiting is made until the given period of time is elapsed.

Figure 10:
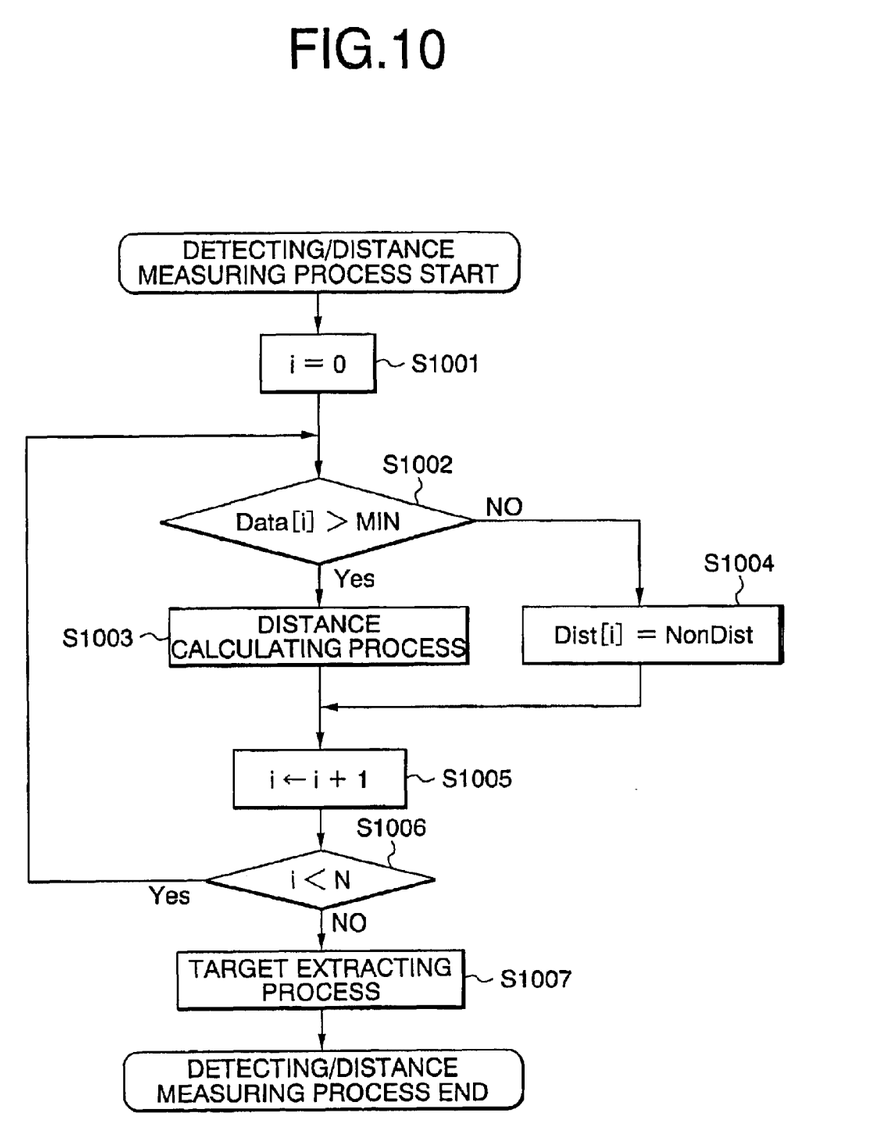
FIG. 10 is a timing chart for explaining detecting/distance measuring processes in accordance with the first embodiment of the present invention.

Then, the detecting/distance measuring process (detecting/distance measuring means 8) of Step S807 will be described with reference to a flowchart of FIG. 10. First, in Step S1001, a range bin No. i is initialized (i=0). Then, in a succeeding Step 1002, it is judged whether or not the A/D value (Data[i]) of the range bin i is larger than a predetermined minimum value MIN. If larger, the processing is advanced to the distance calculating process of Step S1003, but if not larger, the processing is advanced to Step S1004 in which a non-detected corresponding distance (NonDist) is substituted for a register Dist[i] as a distance value. In Step S1005, the range bin No. i increments, and in Step S1006, it is judged whether or not all the range bins have been subjected to the above-mentioned processing. When all the range bins have not yet been subjected to the processing, the processing is returned to Step S1002, and if the processing completed, the processing is shifted to a target extracting process of Step S1007, thus completing the detecting/distance measuring process.

Figure 11:
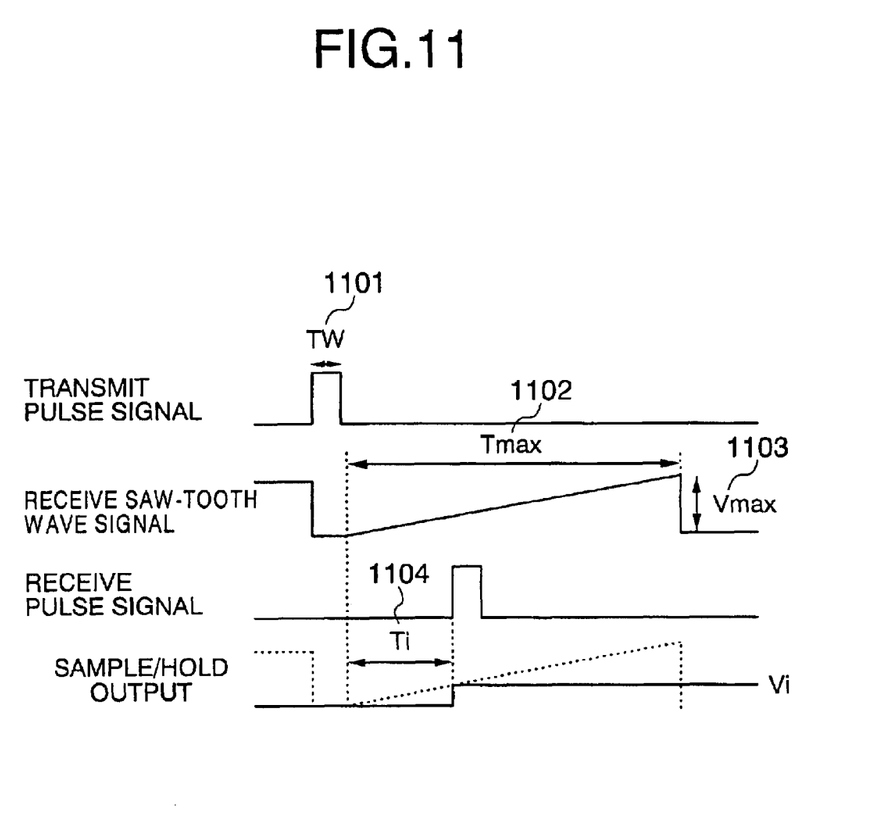
FIG. 11 is a timing chart for explaining a distance calculating process in accordance with the first embodiment of the present invention.

Subsequently, the distance calculating process of Step S1003 will be described in detail. As shown in FIG. 11, assuming that the transmit pulse width is Tw[ns](reference numeral 1101), the total time of a slope portion of the receive saw-tooth signal is Tmax [ns] (reference numeral 1102), the sample/hold output is Vi [V], the maximum level of the receive saw-tooth wave signal is Vmax [V] (reference numeral 1103) and a delay time from the above slope start point of the receive pulse signal is Ti [ns] (reference numeral 1104), Ti is represented as follows:

$$Ti=Tmax \times (Vi/Vmax)[ns] \quad (1)$$

Accordingly, a distance Dist[i] to the target is calculated as follows:

$$Dist[i]=(Ti+Tw) \times 0.15[m] \quad (2)$$

In this example, in the case of Vi>Vmax, Ti=Tmax is satisfied.

Figure 12:
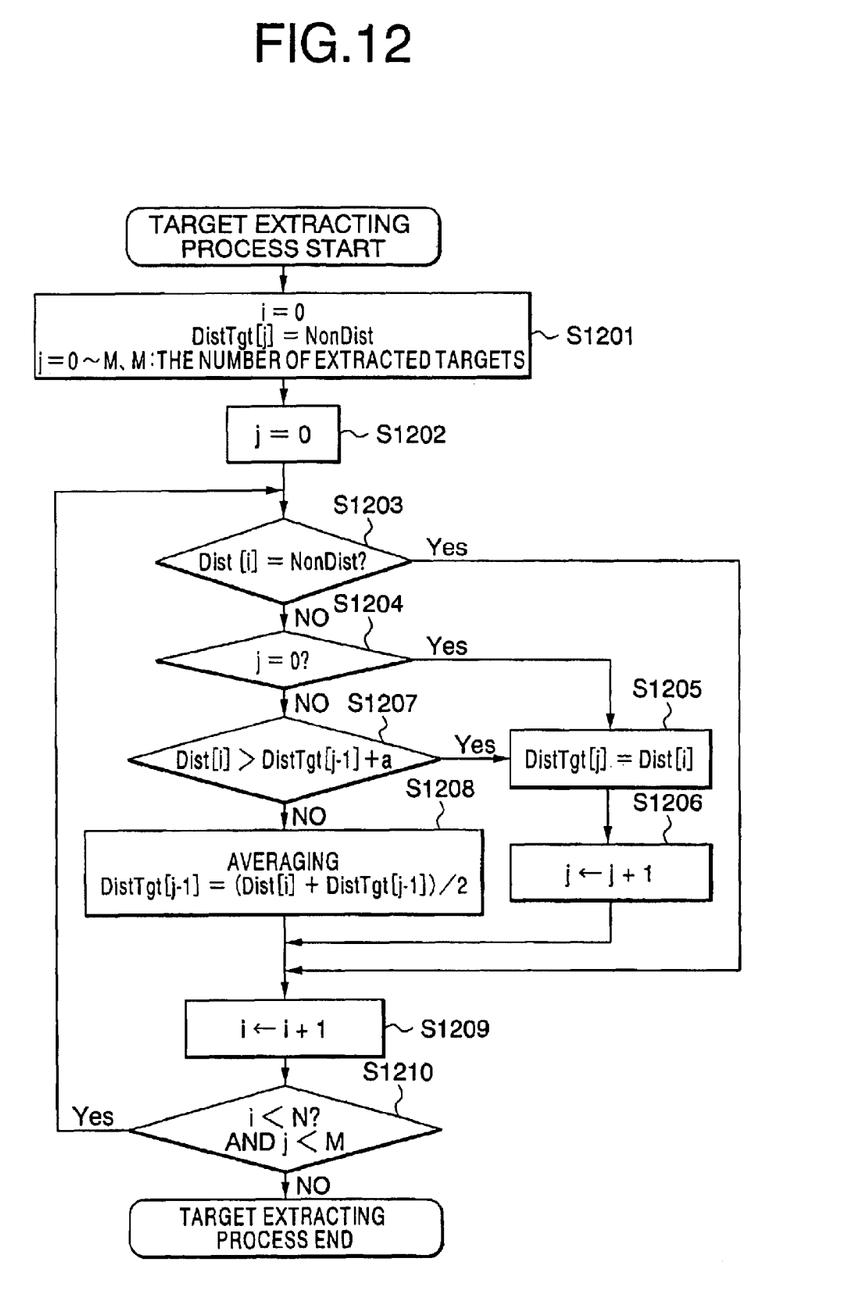
FIG. 12 is a flowchart for explaining a target extracting process in accordance with the first embodiment of the present invention.

Then, the target extracting process of Step S1007 will be described in detail with reference to a flowchart of FIG. 12.

First, in Step S1201, the range bin No. i and the target distance DistTgt[j] (j=0 to M, M is the number of extracted targets) are initialized, respectively. 0 is substituted for the range bin No. i, and the non-detected distance Nondist is substituted for the target distance. Then, in Step S1202, the target No. j=0 is assumed.

In Step S1203, it is judged whether or nor the distance value Dist[i] of the range bin in question is the non-detected distance NonDist and if so, the processing is advanced to Step S1209 that will be described later. If not, it is judged whether or not the target No. j is 0 in Step S1204, and if 0, Dist[i] is substituted for the target distance DistTgt[j] in Step S1205. In addition, the target No. j increments in Step S1206, and the processing is advanced to Step S1209 that will be described later. If the target No. j is not 0 in Step S1204, the processing is advanced to Step S1207 in which it is judged whether or not the distance value Dist[i] of the range bin in question is larger than the target distance DistTgt[j−1]+a (a: a threshold value for judging whether or not it is the same target) and if larger, the processing is advanced to Step S1205. If not larger, Dist[i] is also regarded as the distance value of the same target as that of the DistTgt[j−1], and an averaging process is conducted in Step S1208.

Thereafter, the range bin No. i increments in Step S1209, and if all the range bins have not yet been subjected to the above-mentioned processing and the number of targets does not exceeds the number of extracted targets (M) in Step S1210, the processing is returned to Step S1203, and the above-mentioned processing is conducted. In the case where all the range bins implement the above-mentioned processing or the number of targets exceeds M, the target extracting process is completed.

As described above, according to this embodiment, the receive sample timing is set to a regular interval and a relatively long period, and the transmit timing is changed to substantially change the sampling timing. At the receive side, the signal is sampled and held by using the receive wave and the saw-tooth wave, and the sample/hold voltage is read and converted into the distance value. As a result, the distances to a plurality of targets can be measured inexpensively and with high precision.

Second Embodiment

This embodiment changes the processing within the CPU in the first embodiment, and the other portions are identical with those in the first embodiment. Because the entire structure is identical with that shown in FIGS. 1 and 2, their description will be omitted with reference to those figures.

Figure 13:
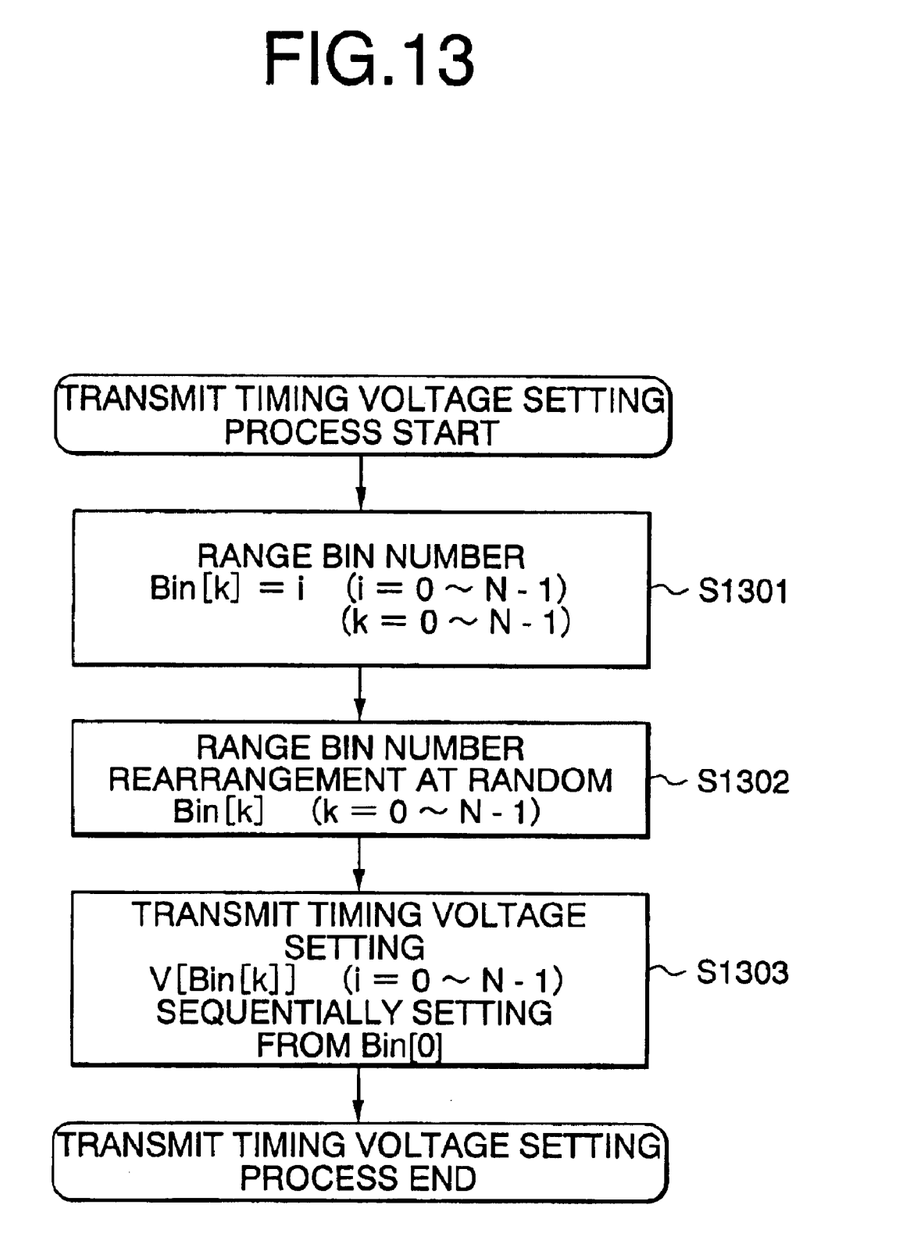
FIG. 13 is a flowchart for explaining a transmit timing voltage setting process in accordance with a second embodiment of the present invention.

A modified portion of this embodiment resides in the transmit timing voltage setting of Step S804 in FIG. 8. In the first embodiment, the transmit timing 1 to the transmit timing N are set in order. In this embodiment, the transmit timing voltage is set at random. FIG. 13 shows a method of setting the transmit timing voltage at random. First, the range bin No. is inputted to the register Bin[k] in Step S1301 (k=0 to N−1). Then, the range bin Nos. are rearranged at random in Step S1302, and then re-inputted to the register Bin[k] Then, V[Bin[k]] is sequentially set from Bin[0] to Bin [N−1] in Step S1303.

As described above, according to this embodiment, since the transmit timing is set at random, an interference resistance performance from a radar of the same type and a disturbance can be improved.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pulse radar device comprising:

a rectangular signal generating means for generating a rectangular signal that is a reference signal;

a transmit timing voltage setting means for setting a voltage value for determining a transmit timing;

a transmit pulse generating means for generating a transmit pulse on the basis of the rectangular signal from the rectangular signal generating means and the voltage value from the transmit timing voltage setting means;

a transmit means for transmitting an electric wave of the generated transmit pulse;

a receive means for receiving a reflection wave obtained by reflecting the electric wave by a plurality of objects so as to output its receive signal;

a receive saw-tooth wave generating means for generating a saw-tooth wave in synchronism with the transmit pulse outputted from the transmit pulse generating means;

a receive signal sample hold means for sample-holding a level of the saw-tooth wave at the time where the receive signal is inputted from the receive means on the basis of the saw-tooth wave from the receive saw-tooth wave generating means and the rectangular signal from the rectangular signal generating means; and a detecting and distance measuring means for detecting the objects and measuring a distance to the objects on the basis of the sample/hold output from the receive signal sample hold means.

2. A pulse radar device according to claim 1, wherein the transmit timing voltage setting means prepares a plurality of voltage values for determining the transmit timing and sets the plurality of voltage values in a given order.

3. A pulse radar device according to claim 1, wherein the transmit timing voltage setting means prepares a plurality of voltage values for determining the transmit timing and sets the plurality of voltage values at random.

* * * * *